US007325892B2

(12) United States Patent
Nishihara

(10) Patent No.: US 7,325,892 B2
(45) Date of Patent: Feb. 5, 2008

(54) INK REMAINING AMOUNT MEASURING DEVICE, INK-JET RECORDER COMPRISING SAME, INK REMAINING AMOUNT MEASURING METHOD, AND INK CARTRIDGE

(75) Inventor: Yuichi Nishihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/515,891

(22) PCT Filed: May 29, 2003

(86) PCT No.: PCT/JP03/06794

§ 371 (c)(1), (2), (4) Date: Nov. 29, 2004

(87) PCT Pub. No.: WO03/099571

PCT Pub. Date: Dec. 4, 2003

(65) Prior Publication Data

US 2005/0212836 A1 Sep. 29, 2005

(30) Foreign Application Priority Data

May 29, 2002 (JP) ............................ 2002-156083
May 27, 2003 (JP) ............................ 2003-149471

(51) Int. Cl.
*B41J 2/195* (2006.01)
*B41J 29/393* (2006.01)
*G01F 23/28* (2006.01)

(52) U.S. Cl. .......................... 347/7; 347/19; 73/290 V

(58) Field of Classification Search ..................... 347/7
See application file for complete search history.

(56) References Cited

U.S. PATENT DOCUMENTS 3,312,107 A * 4/1967 Burns et al. .............. 73/290 V
5,774,136 A * 6/1998 Barbehenn et al. ............ 347/7
5,996,407 A * 12/1999 Hewitt ...................... 73/290 V
6,185,515 B1 2/2001 Froger et al.
6,312,074 B1 11/2001 Walker
6,585,345 B2 * 7/2003 Kosugi ........................ 347/19
6,675,646 B2 * 1/2004 Nishihara ................. 73/290 V (Continued)

FOREIGN PATENT DOCUMENTS

EP 0887629 A1 12/1998

(Continued)

*Primary Examiner*—Matthew Luu
*Assistant Examiner*—Shelby Fidler
(74) *Attorney, Agent, or Firm*—Sughrue Mion, PLLC

(57) ABSTRACT

An ink level detecting unit of an ink jet recording apparatus heightens ink detection accuracy and reliability. A piezoelectric element is provided in an ink tank, an excitation pulse generating part applies an excitation pulse to the piezoelectric element, a sensor detects a frequency of a counter electromotive force waveform from the piezoelectric element based on residual vibration by resonance with a medium in the ink tank, and a judgment part judges the existence of ink on the basis of the detected frequency. The sensor has two band pass filters which cause only waveforms in the predetermined frequency bands that have been previously assumed according to ink presence and absence to pass. A frequency measuring part binarizes the waveform, counts time from the predetermined number-th pulse to the predetermined number of pulses, and detects a frequency on the basis of this time.

11 Claims, 12 Drawing Sheets

U.S. PATENT DOCUMENTS

| | | | | |
|---|---|---|---|---|
| 6,729,184 | B2 * | 5/2004 | Tsukada et al. | 73/290 V |
| 6,851,313 | B2 * | 2/2005 | Fehrenbach | 73/290 V |
| 2002/0012015 | A1 * | 1/2002 | Tsukada et al. | 347/7 |

FOREIGN PATENT DOCUMENTS

| | | | |
|---|---|---|---|
| EP | 1 088 668 | A1 | 4/2001 |
| EP | 1 164 022 | A2 | 12/2001 |
| EP | 1 176 403 | A | 1/2002 |
| JP | 7-137276 | | 5/1995 |
| JP | 7-137276 | A | 5/1995 |
| JP | 9-267488 | | 10/1997 |
| JP | 09-267488 | A | 10/1997 |
| JP | 10-305590 | | 11/1998 |
| JP | 10-305590 | A | 11/1998 |
| JP | 11-78064 | | 3/1999 |
| JP | 11-78064 | A | 3/1999 |
| JP | 1 053 877 | A1 | 11/2000 |
| JP | 2001-147146 | A | 5/2001 |
| JP | 2002-113882 | A | 4/2002 |
| JP | 2002-154216 | A | 5/2002 |
| JP | 2002-154222 | A | 5/2002 |
| JP | 2002-154223 | A | 5/2002 |

* cited by examiner

INK REMAINING AMOUNT MEASURING DEVICE, INK-JET RECORDER COMPRISING SAME, INK REMAINING AMOUNT MEASURING METHOD, AND INK CARTRIDGE

TECHNICAL FIELD

The present invention relates to an ink level detecting unit of an ink jet recording apparatus and an ink level detecting method, and particularly to technology in which change of sound impedance is detected thereby to detect ink level in an ink tank of an ink jet recording apparatus.

BACKGROUND ART

Generally, an ink jet recording apparatus includes a carriage on which an ink jet recording head having a pressure generating means that pressurizes a pressure generating chamber, and a nozzle opening from which the pressurized ink is ejected as an ink droplet is mounted; and an ink tank which houses ink to be supplied through a flowing path to the recording head. The ink jet recording apparatus is constituted so that continuous printing can be performed.

Here, the ink tank is constituted generally as a cartridge that is detachable from the recording apparatus so that a user can easily exchange it when the ink has been used up.

As methods of managing ink consumption of a conventional ink cartridge, there have been known a method of managing ink consumption on calculation by adding up the count number of the ink droplets ejected by the recording head, and the quantity of ink absorbed in a maintenance process of a print head by use of software; and a method of managing ink consumption by detecting, by attaching two electrodes for directly detecting a liquid level to the ink cartridge, the time when the predetermined quantity of ink has been actually consumed.

However, in the method of managing the ink consumption on calculation by adding up the ejection number of the ink droplets and the quantity of the absorbed ink by use of software, depending on environments of use, for example, by rise and fall of temperature or humidity in a using room, the elapse time since opening of the ink cartridge, and difference of a using frequency on user's side, pressure in the ink cartridge and viscosity of ink change. Therefore, there is a problem that an error that is not negligible is produced between the ink consumed quantity on calculation and the actual ink consumed quantity. Further, by individual difference of the ink jet head, the ink quantity per dot varies, thereby to also cause the problem that an error is produced between the ink consumed quantity on calculation and the actual ink consumed quantity. Further, in case that a cartridge is once detached and the same cartridge is attached again, the added count value is once reset, so that there is also a problem that the actual ink level is unclear.

On the other hand, in the method of managing the time when the ink has been consumed by the electrodes, the actual quantity in a point of the ink consumption can be detected. Therefore, the ink level can be managed with high reliability. However, in order to detect liquid level of ink, the ink must be conductive, so that the kind of used ink is limited. Further, there is a problem that liquid closeness structure between the electrode and the ink cartridge is complicated. Further, since the precious metal that is good in conductivity and also high in corrosion resistance is usually used as a material of the electrode, there is also a problem that the manufacturing cost of the ink cartridge increases. Further, since the two electrodes must be attached respectively to the different positions of the ink cartridge, there is also a problem that a manufacturing process is complicated thereby to cause the increase of the manufacturing cost.

On the contrary, an ink level detecting unit has been also proposed, which detects existence of the ink on the basis of a residual vibration frequency of a vibration element such as a piezoelectric element. Namely, the residual vibration frequency of the vibration element such as the piezoelectric element, when the vibration element such as the piezoelectric element and a medium (ink, air or the like) that comes into contact with this vibration element are in a resonant state, means a resonant frequency between the vibration element such as the piezoelectric element and the medium that comes into contact with this vibration element. In the above ink level detecting unit, the state of the ink that is the medium is detected by change of this resonant frequency.

In widely various electronic apparatuses, from a viewpoint of energy-saving, a tendency to set a drive voltage low is spreading. In an ink jet printer, also, the need of making the drive voltage low is increasing.

In the above ink level detecting unit, conventionally, the piezoelectric element is pulse-driven at the drive voltage of, for example, 5V thereby to find the above residual vibration frequency.

However, with lowering of the drive voltage, in case that the drive voltage of the above piezoelectric element is set, for example, at 3.3V, the vibration applied to the piezoelectric element becomes small because of lowering of the drive voltage. Therefore, the amplitude of the above residual vibration becomes also small, so that the level of the detection signal by this residual vibration lowers.

Therefore, in case that the existence of the ink in the ink tank is detected on the basis of the detection signal of this residual vibration, since the level of the detection signal lowers, the ink level detecting unit is easy to receive influences such as noise by motors of the ink jet recording apparatus or noise by inducement of a head drive waveform. As described above, the ink level detecting unit which detects the existence of the ink on the basis of the residual vibration frequency of the vibration element is sensitive to the noise, so that there is a problem that detection accuracy lowers under the environment in which the noise is large, and the detection becomes difficult occasionally.

Further, in such the ink level detecting unit, when the position of the liquid level of the ink is nearly equal to the position of the vibration element such as the piezoelectric element that functions as a sensing element (when the liquid level is in a boundary region of ink presence and ink absence), in case that foaming and waving of the liquid level of the ink are produced with movement of the carriage, there is fear of erroneous detection on the existence of ink.

Therefore, an object of the invention is to provide ink level detecting technology of an ink jet recording apparatus in which excitation is applied to a vibration element such as a piezoelectric element, and residual vibration by resonance between the vibration element and a medium such as ink that comes into contact with the vibration element is surely detected without receiving an influence of noise, thereby to increase ink detecting accuracy and reliability.

Further, another object of the invention is to provide ink level detecting technology of an ink jet recording apparatus in which excitation is applied to a vibration element such as a piezoelectric element, and it is possible to prevent residual vibration by resonance between the vibration element and a medium such as ink that comes into contact with the vibration element, also in case that foaming and waving of a liquid level of ink are produced by movement of a carriage, from being detected erroneously.

DISCLOSURE OF THE INVENTION

In order to solve the above problems, in the invention, there is provided at least one filter means which causes, of counter electromotive force waveforms from the vibration element, only a waveform in the predetermined frequency band that has been previously assumed according to the presence or absence of ink to pass; and the frequency of the counter electromotive force waveform that has passed through this filter means is detected, whereby the existence of ink is judged surely without the influence of the noise.

Namely, an ink level detecting unit of the invention is an ink level detecting unit of an ink tank, which includes a vibration element provided for the ink tank, an excitation pulse generating part which applies an excitation pulse to this piezoelectric element, a sensor which detects a frequency of a counter electromotive force waveform from the vibration element based on residual vibration by resonance with a medium in the ink tank, and a judgment part which judges the existence of ink on the basis of the frequency detected by the sensor. This unit is characterized in that the sensor includes at least one filter means which causes only a waveform in the predetermined frequency band that has been previously assumed according to the presence or absence of ink to pass, and a frequency detecting means which binarizes the counter electromotive force waveform from the vibration element, counts the number of pulses of the binarized counter electromotive force waveform, counts time from the predetermined number-th pulse to the predetermined number of pulse, and detects the frequency of the counter electromotive force waveform on the basis of this time.

According to this constitution, by at least one filter means, without causing noise to pass, the frequency of the counter electromotive force waveform from the vibration element based on the residual vibration by resonance with the medium in the ink tank can be detected. Therefore, the existence of the ink can be surely judged.

Further, the ink level detecting unit of the invention is characterized in that: the filter means comprises a band pass filter for ink presence, and a band pass filter for ink absence, which cause only the waveforms in the predetermined frequency bands that have been previously assumed according to the presence and absence of ink respectively to pass; and the frequency detecting means detects the frequency of the counter electromotive force waveform that has passed through the band pass filter for ink presence or the band pass filter for ink absence.

According to this constitution, it is possible to detect the frequency of only the counter electromotive force waveform that has passed through the band pass filter for ink presence or the band pass filter for ink absence which causes only the waveform in the predetermined frequency band that has been previously assumed according to the presence or absence of ink. Therefore, without the influence of the noise, the existence of the ink can be surely judged.

Further, the ink level detecting unit of the invention is characterized in that the frequency detecting means comprises a frequency counter for ink presence which detects a frequency of the waveform that has passed through the band pass filter for ink presence, and a frequency counter for ink absence which detects a frequency of the waveform that has passed through the band pass filter for ink absence.

According to this constitution, at two measurement circuits in which the band pass filter for ink presence and the frequency counter for ink presence, and the band pass filter for ink absence and the frequency counter for ink absence are provided in parallel, the frequency of the counter electromotive force waveform from the vibration element based on the residual vibration can be detected simultaneously.

Further, the ink level detecting unit of the invention is characterized in that: in the band pass filter for ink presence and the band pass filter for ink absence, each center frequency is matched with a resonant frequency of the vibration element in a case of the ink presence or in a case of the ink absence; and each pass band is set to size that can permit the individual variation in the vibration element.

According to this constitution, while the individual variation in the sensor is permitted, the invention can be applied to an ink jet recording apparatus.

Further, the ink level detecting unit of the invention is characterized in that an insensitive band is provided between the pass bands of both band pass filter for ink presence and band pass filter for ink absence.

According to this constitution, also when a position of a liquid level of ink is nearly equal to a position of the vibration element (even when a position of a liquid level of ink is in a boundary region between the ink presence and the ink absence), it is possible to prevent erroneous detection of the existence of the ink due to foaming or waving of the liquid level of the ink with movement of a carriage.

Further, an ink cartridge of the invention, which houses ink used in printing and is mounted on an ink jet recording apparatus, is characterized in that: there are provided a vibration element provided for the ink cartridge, an excitation pulse generating part which applies an excitation pulse to this piezoelectric element, a sensor which detects a frequency of a counter electromotive force waveform from the vibration element based on residual vibration by resonance with a medium in the ink cartridge, and a judgment part which judges the existence of ink on the basis of the frequency detected by the sensor; and the sensor includes at least one filter means which causes only a waveform in the predetermined frequency band that has been previously assumed according to the presence or absence of ink to pass, and a frequency detecting means which binarizes the counter electromotive force waveform from the vibration element, counts the number of pulses of the binarized counter electromotive force waveform, counts time from the predetermined number-th pulse to the predetermined number of pulse, and detects the frequency of the counter electromotive force waveform on the basis of this time.

According to this constitution, by at least one filter means, without causing noise to pass, the frequency of the counter electromotive force waveform from the vibration element based on the residual vibration due to resonance with the medium in the ink cartridge can be detected. Therefore, the existence of ink can be surely judged.

Further, an ink level detecting method of an ink jet recording apparatus in the invention is a method of detecting ink level in an ink tank used in the ink jet recording apparatus by applying an excitation pulse to a vibration element provided for the ink tank, detecting a frequency of a counter electromotive force waveform from the vibration element based on residual vibration due to resonance with a medium in the ink tank, and judging the existence of ink on the basis of the detected frequency. This method is characterized in that: of counter electromotive force waveforms from the vibration element, only a waveform in the predetermined frequency band that has been previously assumed according to the presence or absence of ink is caused to pass by a filter means; the waveform that has passed is binarized and the number of pulses of the binarized waveform is counted; time from the predetermined number-th pulse to the predetermined number of pulse is counted; and the frequency of the counter electromotive force waveform is detected on the basis of this time.

According to this constitution, by the filter means, without causing the noise to pass, the frequency of the counter electromotive force waveform from the vibration element based on the residual vibration by resonance with the medium in the ink tank can be detected. Therefore, the existence of ink can be surely judged.

Further, the ink level detecting method of the ink jet recording apparatus in the invention is characterized by using both of the above ink level detecting method and a method of detecting the ink level by counting the number of dots of ink ejected from a print head in the ink jet recording apparatus.

According to this constitution, ink-end can be detected more exactly than in case of detection by only the method of detecting the ink level by counting the number of dots of ink.

BEST MODE FOR CARRYING OUT THE INVENTION

The invention will be described below in detail with reference to modes for carrying out the invention. The following embodiments do not limit the invention in claims, and all combinations of features described in the embodiments are not always indispensable for solving means of the invention.

An ink level detecting unit according to embodiments of the invention will be described below with reference to drawings.

Figure 1:
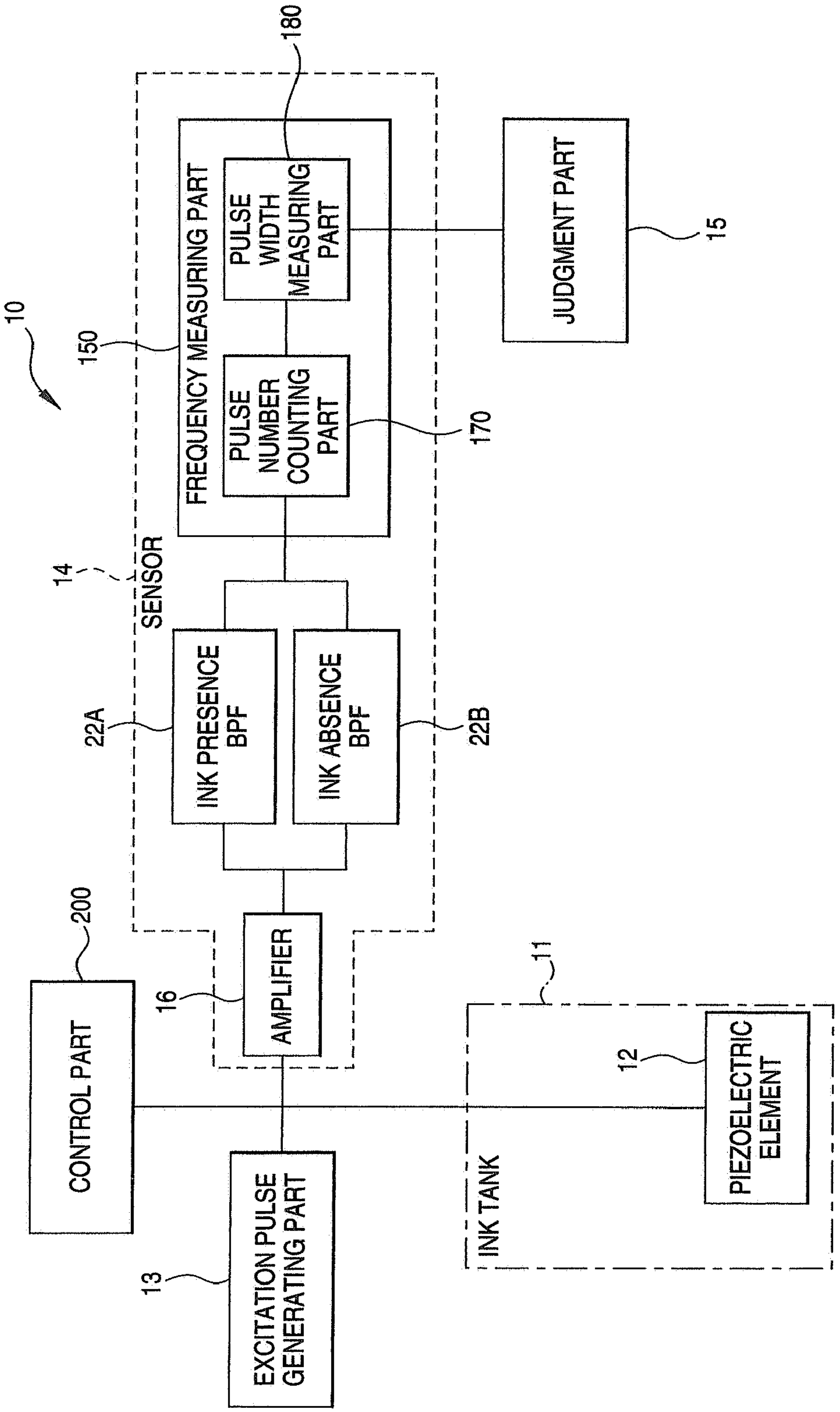
FIG. 1 is a block diagram showing the constitution of an ink level detecting unit according to a first embodiment of the invention.

FIG. 1 shows the constitution of an ink level detecting unit according to a first embodiment of the invention. In FIG. 1, an ink level detecting unit 10 comprises a piezoelectric element 12 functioning as a vibration element provided for a cartridge type ink tank 11 attached to an ink jet recording apparatus (ink jet type printer) detachably; an excitation pulse generating part 13 for applying an excitation pulse to this piezoelectric element 12; a sensor 14 which detects a frequency of a counter electromotive force waveform based on residual vibration by resonance with ink produced in this piezoelectric element 12; a judgment part 15 which judges the existence of ink; and a control part 200 which controls theses excitation pulse generating part 13, sensor 14, and judgment part 15.

Here, the piezoelectric element 12 in FIG. 1 is actually, in a print head unit of an ink jet type printer, provided for an ink tank 11 of each color.

The above piezoelectric element 12 is so constituted as to produce displacement by the applied voltage, resonate to a medium, that is, ink or air in the ink tank 11, and produce residual vibration by this resonance. By this residual vibration, a counter electromotive force waveform is produced in the piezoelectric element 12.

The excitation pulse generating part 13, which registers two kinds of excitation pulses previously, is constituted so as to output these excitation pulses selectively.

Here, of the two kinds of excitation pulses, a first kind of excitation pulse is an excitation pulse having a pulse width and a pulse period corresponding to the residual vibration by the resonance with the ink when the ink exists in the ink tank 11. A second kind of excitation pulse is an excitation pulse having a pulse width and a pulse period corresponding to the residual vibration by the resonance with the air when the ink does not exist in the ink tank 11.

The above sensor 14 shown in FIG. 1 comprises an amplifier 16, a band pass filter (BPF) for ink presence 22A, a band pass filter (BPF) for ink absence 22B, and a frequency measuring part 150. The frequency measuring part 150 further includes a pulse number counter 170 and a pulse width measuring part 180.

Figure 2:
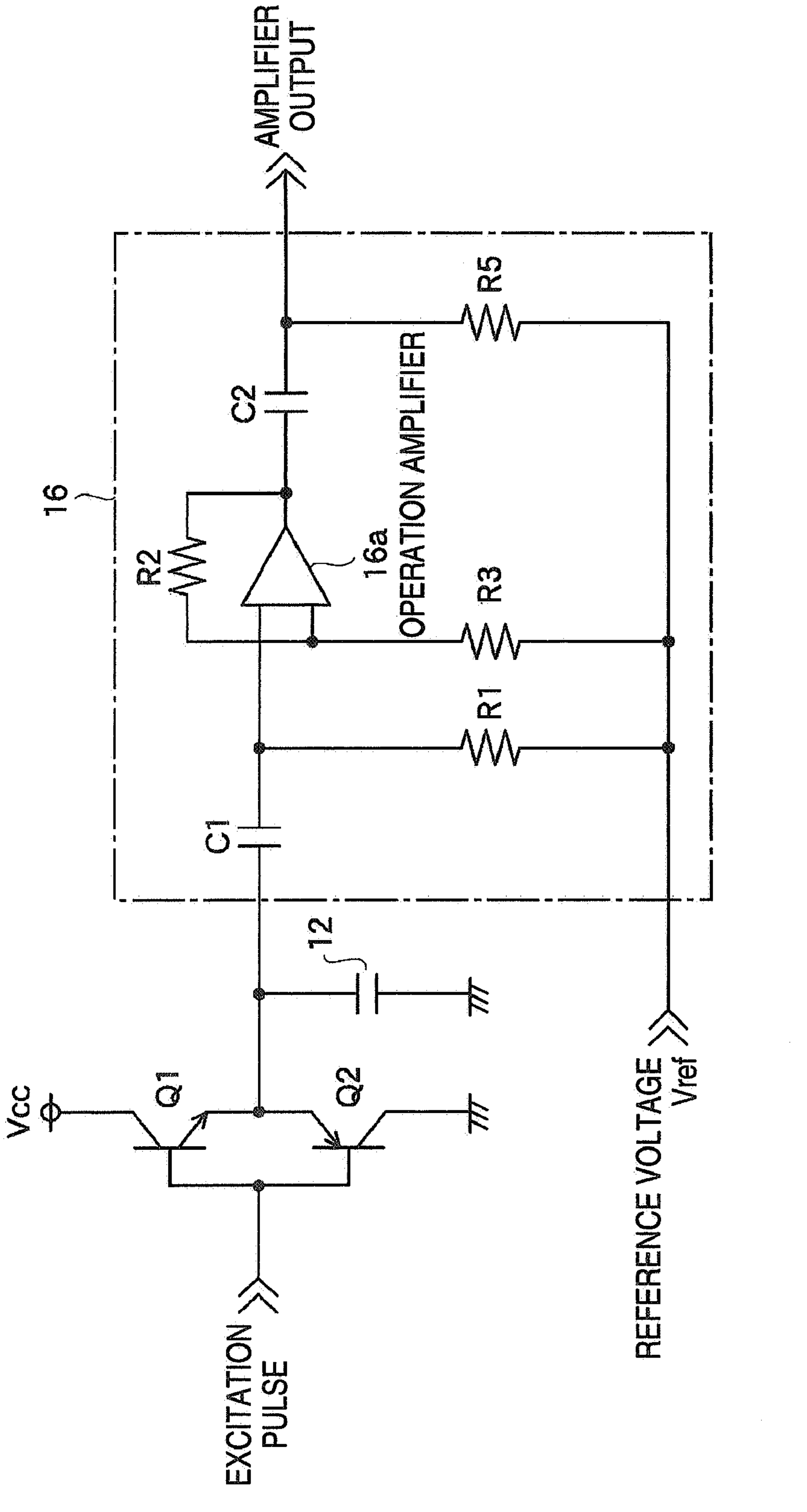
FIG. 2 is a wiring diagram showing an example of the concrete constitution of an amplifier of a sensor in the ink level detecting unit of FIG. 1.

The above amplifier 16 is, as shown in FIG. 2, for example, so constituted that the counter electromotive force waveform from the piezoelectric element 12 is amplified by an operational amplifier 16*a* thereby to be made into a waveform having reference voltage Vref in the center of vibration.

The above band pass filter (BPF) for ink presence 22A, and the band pass filter (BPF) for ink absence 22B are band pass filters of which the respective center frequencies are matched with frequencies of the output waveforms obtained by the ink level detecting unit in the embodiment in case that the ink is present and absent. Namely, in the band pass filter (BPF) for ink presence 22A, its center frequency is matched with 100 kHz frequency of the output waveform in case the ink is present. On the other hand, in the band pass filter (BPF) for ink absence 22B, its center frequency is matched with 160 kHz frequency of the output waveform in case the ink is absent.

The above band pass filter (BPF) for ink presence 22A, and the band pass filter (BPF) for ink absence 22B have respectively ±10 kHz pass band width of each center frequency. This takes individual variation in the piezoelectric element as the sensor into consideration. Namely, the band pass filter (BPF) for ink presence 22A has 90 kHz to 110 kHz pass band width. On the other hand, the band pass filter (BPF) for ink absence 22B has 150 kHz to 170 kHz pass band width. Therefore, 110 kHz to 150 kHz that is an intermediate frequency region of the pass band widths of the both filters is set so as to become an insensitive band of the sensor in a way.

A first feature of the embodiment, as described above, is that the two band pass filters of which respective center frequencies are matched with the frequencies of the output waveforms in case the ink is present and in case that the ink is absent are used.

Further, a second feature of the embodiment is that the pass band widths of the both filters are set so that the individual variation in the sensor is taken into consideration, and the intermediate frequency region between the pass band widths of the both filters becomes the above insensitive band.

The above frequency measuring part 150 is a single frequency counter provided for the two filters of the band pass filter (BPF) for ink presence 22A and the band pass filter (BPF) for ink absence 22B, and connection of the frequency measuring part 150 is switched, according to a control signal from the control part 200, to either the band pass filter (BPF) for ink presence 22A or the band pass filter (BPF) for ink absence 22B.

The pulse number counter 170 in this frequency measuring part 150 compares the counter electromotive force waveform input from the amplifier 16 through the band pass filter (BPF) for ink presence 22A or the band pass filter (BPF) for ink absence 22B with the reference voltage Vref by use of a comparator. In case that the counter electromotive force waveform is higher than the reference voltage Vref, the pulse number counter 170 outputs a signal thereby to binarize the counter electromotive force waveform, counts the number of pulses of this binarized counter electromotive force waveform, and generates a time count pulse which becomes an H-level only for time from the predetermined number-th pulse to the predetermined number of pulse (for example, time from the fifth pulse to the eighth pulse). Further, the pulse width measuring part 180 measures the pulse width of the time count pulse from the pulse number counter 170, calculates the pulse number per unit time, and detects the frequency of the pulse of the counter electromotive force waveform.

The above judgment part 15, on the basis of the frequency of the pulse of the counter electromotive force waveform detected in the sensor 14, judges the existence of ink in a height position where the piezoelectric element 12 in the ink tank 11 is provided, and outputs a judgment result to the control part 200 provided for, for example, a printer body of the ink jet type printer.

The above control part 200 comprises, for example, a microcomputer, a CPU, and the like; and controls, in accordance with an ink level detecting method of the invention, the excitation pulse generating part 13, the sensor 14, and the judgment part 15 thereby to detect the ink level as described later.

Further, a main control part of the printer body may be constituted so as to have the function of the control part 200.

The ink level detecting unit 10 according to the first embodiment of the invention is thus constructed, and operates, on the basis of an ink level detecting method according to the first embodiment of the invention, in accordance with a flowchart of FIG. 3, as follows.

Figure 4:
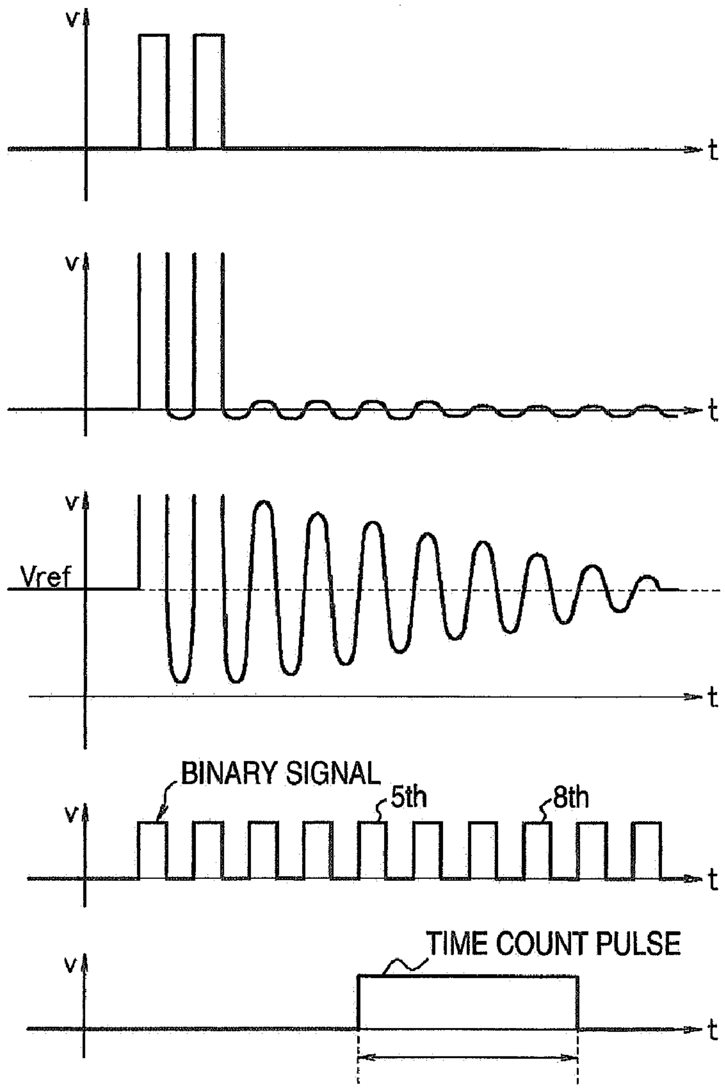
FIGS. 4(A)-(E) are time charts showing a signal of each part in measurement of a frequency of residual vibration in FIG. 1.

Firstly, in a step A1, the control part 200 clears a remeasurement flag, and thereafter, sends a control signal in a step A2 thereby to switch the connection of the frequency measuring part 150 to the band pass filter (BPF) for ink presence 22A. In a step A3, by the excitation pulse generating part 13, as a target frequency, that is, an excitation pulse, the excitation pulse when the ink exists is selected, and this excitation pulse is generated. Hereby, the excitation pulse shown in FIG. 4A is applied to the piezoelectric element 12, so that the piezoelectric element vibrates. The ink in the ink tank 11 resonates by the vibration of the piezoelectric element 12. In result, the piezoelectric element 12 generates residual vibration by this resonance. Next, the control part 200 controls the sensor 14, and measures the frequency of the residual vibration of the piezoelectric element 12 as follows.

Namely, the piezoelectric element 12, by the residual vibration by the resonance with the ink in the ink tank 11, generates a counter electromotive force waveform as shown in FIG. 4B.

This counter electromotive force waveform is amplified, as shown in FIG. 4C, by the operational amplifier 16*a* of the amplifier 16 with the reference voltage Vref in the center of vibration. In case that an ink liquid level is higher than a sensor position of the ink tank 11, that is, a position in which the piezoelectric element 12 is located (in case that the ink exists), this counter electromotive force waveform has a frequency between 90 KHz to 100 KHz due to the individual variation in the sensor. Therefore, since its frequency is in the pass bandwidth of the band pass filter (BPF) for ink presence 22A, the counter electromotive force waveform passes through the band pass filter (BPF) for ink presence 22A and is input in the pulse number counter 170 of the frequency measuring part 150. Then, the pulse number counter 170 compares this counter electromotive force waveform with the reference voltage Vref by use of the comparator, binarizes the counter electromotive force waveform, as shown in FIG. 4D, counts this binary signal, and generates, as shown in FIG. 4E, a time count pulse which becomes an H-level only for time from the predetermined number-th pulse to the predetermined number of pulse (in FIG. 4E, from the fifth pulse to the eighth pulse).

Hereby, the pulse width measuring part 180 measures the pulse width of this time count pulse, and finds a residual vibration frequency from this pulse width. At this time, even if high frequency noise due to the motor of the ink jet type printer or due to induction of the head drive waveform is applied to the sensor system from the piezoelectric element 12, the frequency of such the high frequency noise does not exist in the pass band width of the band pass filter (BPF) for ink presence 22A. Therefore, the high frequency noise cannot pass through the band pass filter (BPF) for ink presence 22A, so that it is not input in the pulse number counter 170 of the frequency measuring part 150.

Subsequently, in a step A4, the control part 200, by confirming the generation of the above time count pulse within the predetermined time, judges whether the frequency measurement of the residual vibration of the piezoelectric element 12 by the resonance with the ink has succeeded. In case that the measurement has succeeded, the control part 200 outputs its frequency in a step A5, the judgment part 15 judges the existence of ink, and the ink level detecting operation ends.

Here, the judgment part 15, by judging the residual vibration frequency is in the frequency range in case of the ink presence, judges the existence of the ink.

In case that the residual vibration frequency is not in the frequency range in case of the ink presence, processing similar to a case of measurement failure in the step A4 may be performed.

On the contrary, in case that the frequency measurement of the residual vibration has failed in the step A4, the control part 200 sends a control signal in a step A6 and switches the connection of the frequency measuring part 150 to the band pass filter (BPF) for ink absence 22B. Then, in a step A7, the second excitation pulse when the ink is absent is selected as a target frequency, that is, an excitation pulse of the piezoelectric element 12, and this second excitation pulse is generated, whereby the piezoelectric element 12 vibrates and resonates with the ink or air in the ink tank 11. The piezoelectric element 12 generates residual vibration by resonance with the ink or air. Then, the control part 200 controls the sensor 14 as described later, thereby to measure the frequency of the residual vibration of the piezoelectric element 12.

Subsequently, in a step A8, the control part 200 judges whether the frequency measurement of the residual vibration has succeeded. In case that the measurement has succeeded, the control part 200 outputs its frequency in the step A5, the judgment part 15 judges the absence of ink, and the ink level detecting operation ends.

In case that the residual vibration frequency is not in the frequency range in case of the ink absence, processing similar to a case of measurement failure in the step A8 may be performed.

Further, in case that a remeasurement flag is not set up in a step A9, the control part 200, after setting up the remeasurement flag in a step A10, waits till a carriage motor for moving the printer head of the ink jet type printer and a paper feeding motor stop and further ink ejection stops, and returns to the step A2. Hereby, influences such as noise due to the carriage motor and the paper feeding motor, and noise due to drive waveform signals in the ink ejection are removed, and the ink level is detected again.

On the contrary, in case that the remeasurement flag is set up in the step A9, since the remeasurement of the ink level has been performed in the steps A2 to A8 through the steps A10 to A11, the control part 200 performs, as failure of the ink level detection, such appropriate processing as to stop the printing operation of the ink jet type printer in a step A12, and the ink level detecting operation ends.

In the above embodiment, the excitation pulse generating part 13 registers previously two kinds of excitation pulses corresponding to the residual vibrations of the piezoelectric element 12 in case of the ink presence and in case of the ink absence. Firstly, by the first excitation pulse in case of the ink presence, the frequency of the residual vibration is measured. When the measurement fails, the frequency of the residual vibration is measured by the second excitation pulse in case of the ink absence.

In this case, the residual vibration frequency is measured (the steps A3 and A7 in FIG. 3) by the ink level detecting unit 10 in accordance with a flowchart shown in FIG. 5 as follows.

Figure 3:
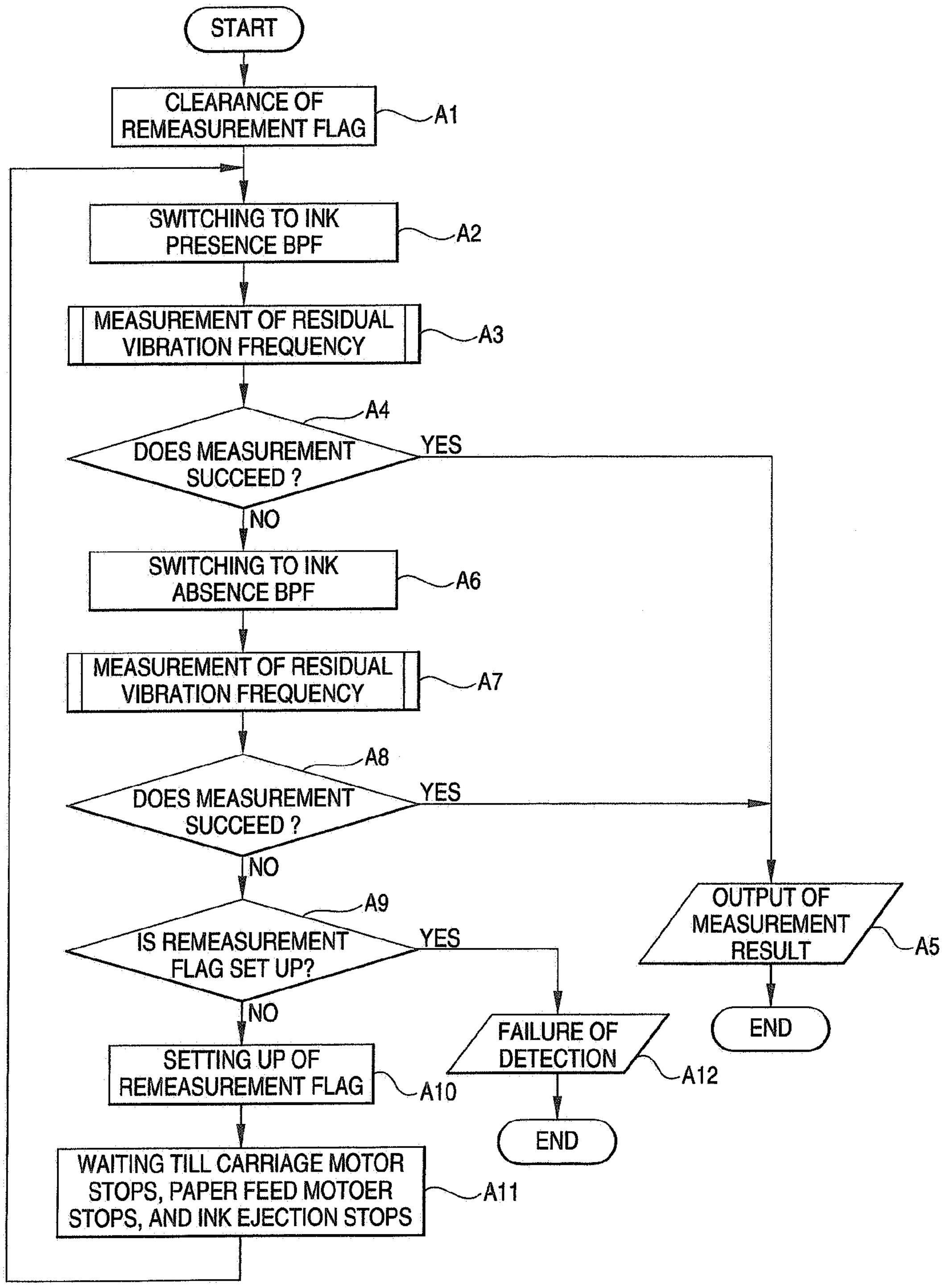
FIG. 3 is a flowchart showing the operation of ink level detection in the ink level detecting unit of FIG. 1.
Figure 5:
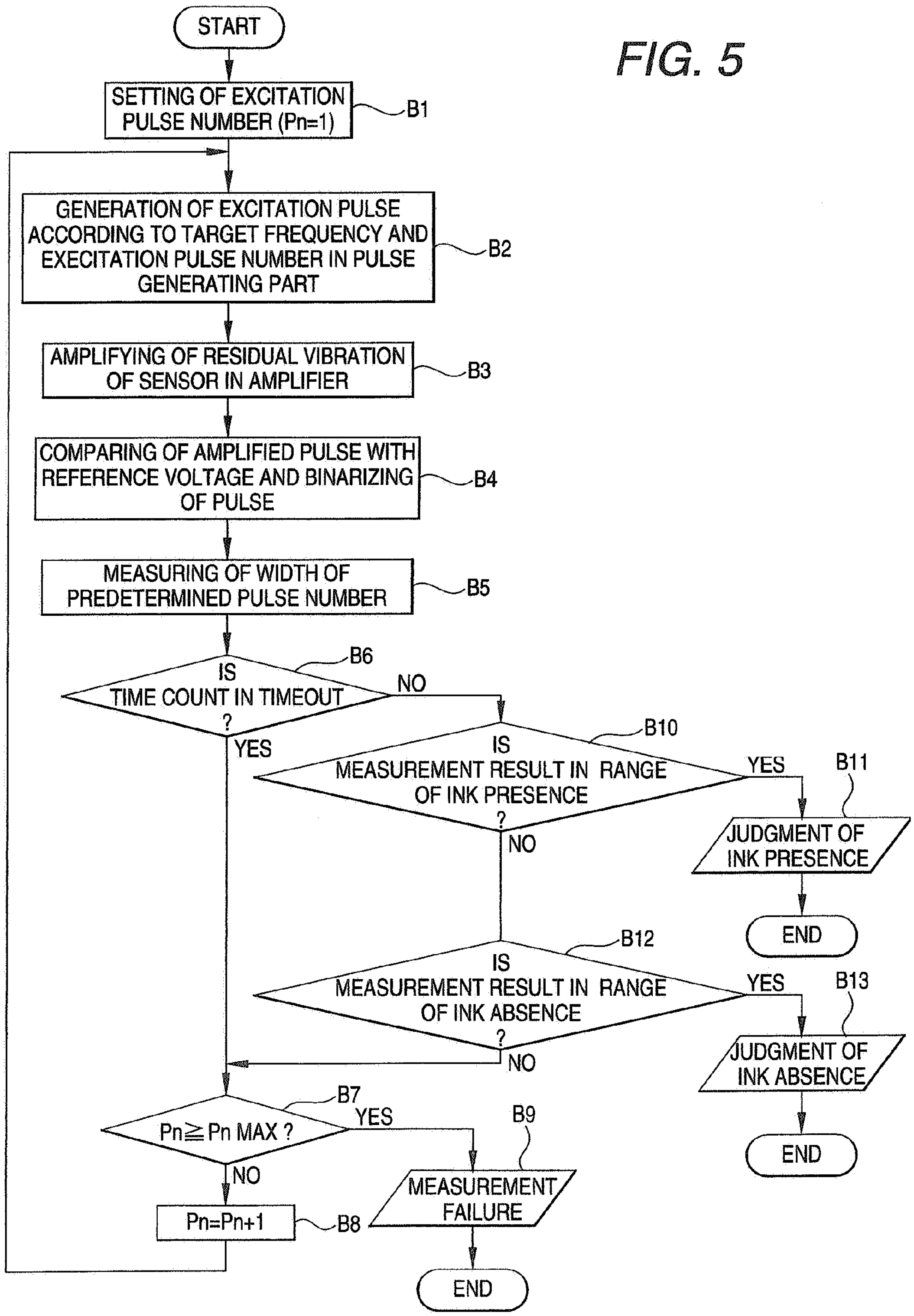
FIG. 5 is a flowchart showing the detailed operation of measurement (steps A3 and A7 in the flowchart shown in FIG. 3) of the residual vibration frequency in the ink level detecting unit of FIG. 1.

Namely, in case that the target frequency is set to a frequency in case of the ink presence in the step A2 of the flowchart of FIG. 3, firstly, in a step B1 of the flowchart of FIG. 5, the control part 200 sets the pulse number (Pn) of the first excitation pulse as the target pulse to one (Pn=1) by use of the excitation pulse generating part 13. In a step B2, the excitation pulse generating part 13 generates one first excitation pulse (pulse according to the case of the ink presence), and applies this excitation pulse to the piezoelectric element 12.

Then, in a step B3, the control part 200 controls the sensor 14 to amplify, by use of the operational amplifier 16*a* of the amplifier 16, the counter electromotive force waveform based on the residual vibration by the resonance with the ink produced in the piezoelectric element 12, compare, in a step B4, the amplified counter electromotive force pulse with the reference voltage Vref by use of the comparator 16*b*, and binarize this pulse.

Sequentially, the control part 200, in a step B5, causes the pulse counting part 170 to count the above binary signal and generate a time count pulse which becomes H-level only for time from the predetermined number-th pulse to the predetermined number of pulse (for example, from the fifth pulse to the eighth pulse), and causes the pulse width measuring part 180 to measure a pulse width of the above time counting pulse and measure the frequency of the residual vibration of the piezoelectric element 12.

Next, the control part 200, in a step B6, judges whether the pulse width has been able to be measured within the predetermined time or not, that is, whether the time count is in timeout. In case that the measurement is in timeout (In case of Yes in the step B6), the control part 200, in a step B7, judges whether n has reached a maximum value. In case that n does not reach the maximum value, the control part 200, in a step B8, increases the number of pulses by one (n=n+1) thereby to provide two pulses, returns to the step B2, and performs remeasurement. This processing is repeated, and in case that the vibration frequency cannot be measured (Yes in the step B7) even if that the number of pulses is increased till n reaches the maximum value (Pn=Pnmax) in the step B7, it is judged in a step B9 that the ink level detection (measurement) fails, and the control part 200 proceeds to the steps A4 to A6 in the flowchart of FIG. 3. Namely, as the target pulse, the second excitation pulse (pulse according to the case of the ink absence) is set.

On the contrary, in case that the time count is not in timeout in the step B6, the control part 200 judges in a step 10, whether the frequency of the residual vibration is in the frequency range in case of the ink presence. In case that the frequency of the residual vibration is in the frequency range in case of the ink presence, the control part 200 judges in a step B11 that the ink is present. In result, the ink level detection (measurement)becomes successful, and the control part 200 proceeds from the step A4 to the step A5 in the flowchart of FIG. 3.

Further, in the step B10, in case that the frequency of the residual vibration is not in the frequency range in case of the ink presence, the control part 200 judges in a step B12 whether the frequency of the residual vibration is in the frequency range in case of the ink absence. In case that the frequency of the residual vibration is in the frequency range in case of the ink absence, the control part 200 judges in a step B13 that the ink is absent. Similarly, the ink level detection (measurement) becomes successful, and the control part 200 proceeds from the step A4 to the step A5 in the flowchart of FIG. 3.

On the contrary, in the step B12, in case that the frequency of the residual vibration is not in the frequency range in case of the ink absence, the existence of ink cannot be judged. Therefore, the control part proceeds to the step B7, and performs the processing similar to the processing in case of the timeout. Namely, while the number of pulses is increased to Pnmax, the measurement is repeated. Further, the operation in the step A7 of FIG. 3 (the operation in case that the control part proceeds from the step A7 to the step A8) is also performed in accordance with the flowchart of FIG. 5 similarly.

Thus, by measuring the residual vibration frequency of the piezoelectric element 12 by the resonance with the ink in the ink tank 11, the judgment of the existence of ink can be more exactly performed.

In the conventional ink level detecting unit which utilizes the residual vibration frequency of the vibration element similarly to the unit in this embodiment, as described before, when the position of the liquid level of the ink is nearly equal to the position of the vibration element such as the piezoelectric element functioning as a sensing element (in a boundary region between the ink presence and the ink absence), in case that foaming and waving of the liquid level of the ink are produced with the movement of the carriage, there is fear of erroneous detection on the existence of ink.

However, in the ink level detecting unit of this embodiment, the frequency region 110 kHz to 150 kHz between the pass band width of the band pass filter (BPF) for ink presence 22A and the pass band width of the band pass filter (BPF) for ink absence 22B is set so as to become an insensitive band of the sensor in a way. Therefore, when the position of the liquid level of the ink in the ink tank 11 is nearly equal to the position of the vibration element 12 (in the boundary region between the ink presence and the ink absence), unevenness of outputs due to foaming and waving of the ink liquid level produced with the movement of the carriage is shut off by this insensitive band. In result, the above erroneous detection is never performed. Namely, in this case, in either of the residual vibration frequency measurements in the steps A3 and A7 in the flowchart of FIG. 3, the measurements fail, so that the control part proceeds to the step 11, waits till the carriage motor for moving the printer head of the ink jet type printer and the paper feeding motor stop and further ink ejection stops, and returns to the step A2. Hereby, the influences such as noise due to the carriage motor and the paper feeding motor, and noise due to the drive waveform signals in the ink ejection are completely removed, and the ink level is detected again.

As described above, in the ink level detecting unit of the embodiment, even in case that foaming and waving of the ink liquid level are produced with the movement of the carriage, the erroneous detection can be prevented.

Further, in either of the residual vibration frequency measurements in the steps A3 and A7 in the flowchart of FIG. 3, as described above, even if the high-frequency noise due to the motor of the ink jet type printer or due to induction of the head drive waveform is applied to the sensor system from the piezoelectric element 12, the frequency of such the high frequency noise does not exist in the pass band widths of the band pass filter (BPF) for ink presence 22A and the band pass filter (BPF) for ink absence 22B. Therefore, the high frequency noise cannot pass through the band pass filter (BPF) for ink presence 22A or the band pass filter (BPF) for ink absence 22B, so that it is not input in the pulse number counter 170 of the frequency measuring part 150. Accordingly, the exact detection of the existence of ink in which the influence of such the noise is eliminated can be performed.

In the ink level detecting unit of the embodiment, since the influences of the noises due to the motors such as the carriage motor and due to the drive waveform signal for ink ejection can be eliminated, without stopping the printing operation of the ink jet type printer, that is, without stopping the carriage motor and the paper feeding motor, and further without stopping the ink ejection by the drive waveform signal, the comparatively exact detection of the existence of ink can be performed. Therefore, though the detection can be performed also during movement (main scan) of the carriage, it is preferable, as timing of detection, to perform the detection, of a series of moving operations of the carriage which comprise the steps of accelerating from a stop position, printing at a constant speed, decelerating, and stopping, during printing at the constant speed. This is because foaming and waving of the liquid level of the ink with the movement of the carriage are comparatively little.

Figure 6:
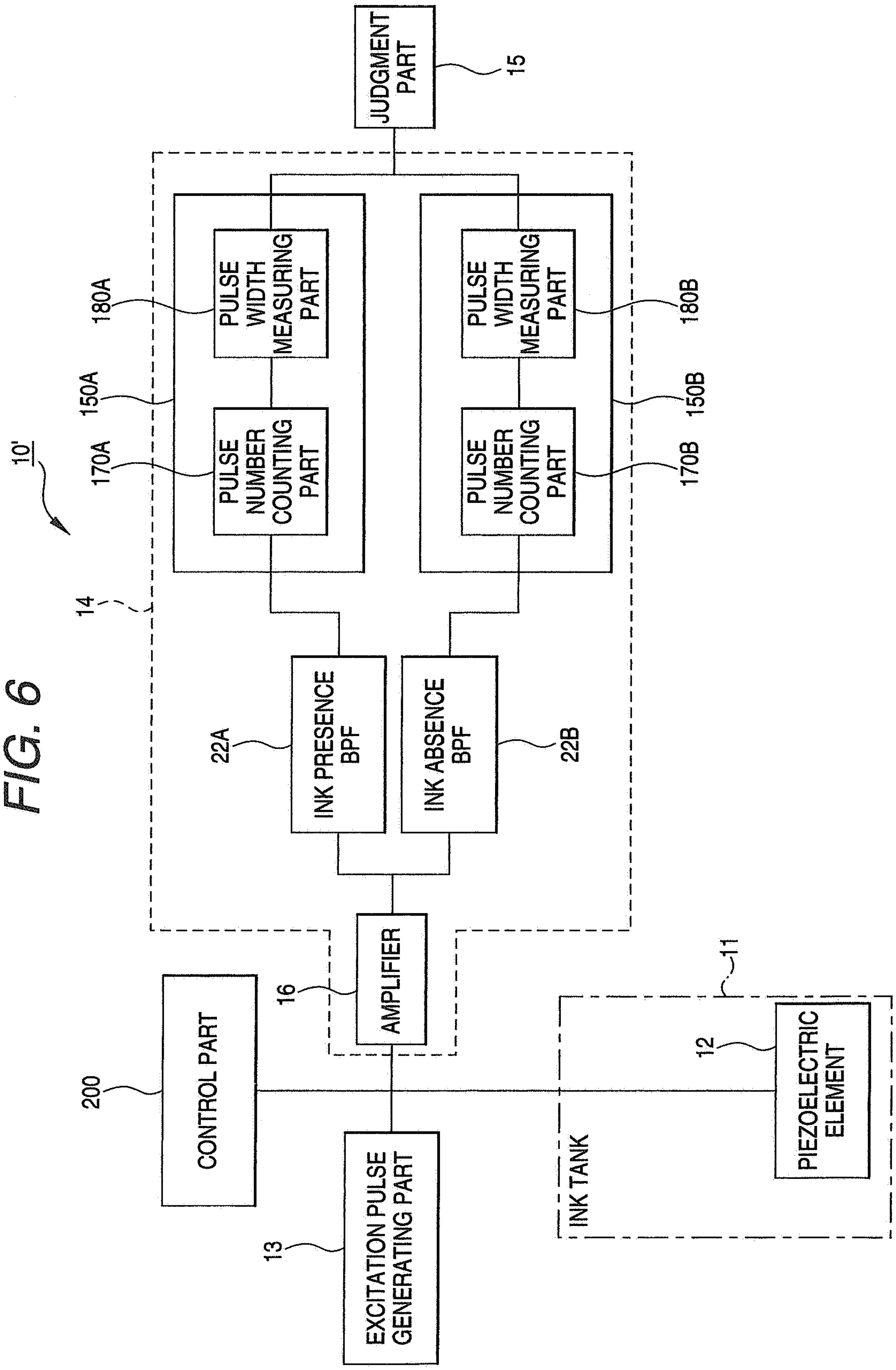
FIG. 6 is a block diagram showing the constitution of an ink level detecting unit according to a second embodiment of the invention.

FIG. 6 shows the constitution of an ink level detecting unit according to a second embodiment of the invention. The basic constitution of the ink level detecting unit of this embodiment is nearly the same as that in the first embodiment. The similar parts to those in the first embodiment are denoted with the similar reference numerals, and their description is omitted. In FIG. 6, a sensor 14' comprises an amplifier 16, a band pass filter (BPF) for ink presence 22A, a frequency measuring part 150A connected to the band pass filter (BPF) for ink presence 22A, a band pass filter (BPF) for ink absence 22B, and a frequency measuring part 150B connected to the band pass filter (BPF) for ink absence 22B. The frequency measuring part 150A further includes a pulse number counter 170A and a pulse width measuring part 180A, and the frequency measuring part 150B further includes a pulse number counter 170B and a pulse width measuring part 180B. As described above, this embodiment is characterized in that: there are two frequency measuring circuits which comprise the band pass filter (BPF) for ink presence 22A and the frequency measuring part 150A connected to the band pass filter (BPF) for ink presence 22A, the band pass filter (BPF) for ink absence 22B and the frequency measuring part 150B connected to the band pass filter (BPF) for ink absence 22B; and a frequency of a pulse in case of ink presence and a frequency of a pulse in case of ink absence are measured in their respective circuits.

Figure 7:
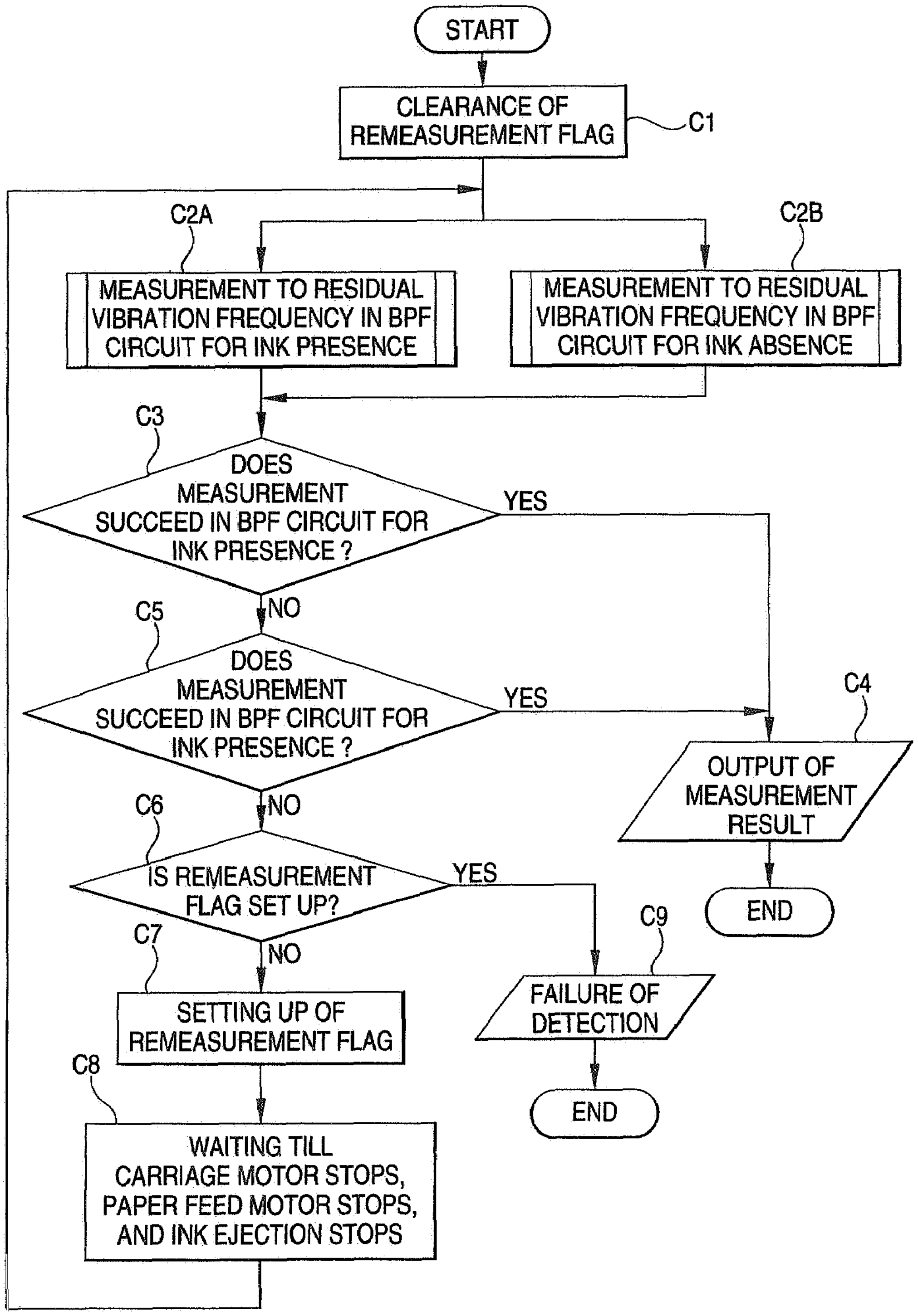
FIG. 7 is a flowchart showing the operation of ink level detection in the ink level detecting unit of FIG. 6.

The ink level detecting unit 10' according to the second embodiment of the invention is thus constructed, and operates, on the basis of an ink level detecting method according to the second embodiment of the invention, in accordance with a flowchart of FIG. 7, as follows.

Firstly, in a step C1, a control part 200 clears a remeasurement flag, and thereafter, a frequency of residual vibration of a piezoelectric element 12 is measured simultaneously in the BPF circuit for ink presence comprising the band pass filter (BPF) for ink presence 22A and the frequency measuring part 150A and the BPF circuit for ink absence comprising the band pass filter (BPF) for ink absence 22B and the frequency measuring part 150B. Namely, in a step C2A, by an excitation pulse generating part 13, as a target frequency, that is, an excitation pulse, an excitation pulse when the ink is present is selected, and this excitation pulse is generated. Hereby, the frequency of the residual vibration of the piezoelectric element 12 is measured as shown in FIGS. 4A to 4E. Further, in a step C2B, by the excitation pulse generating part 13, as a target frequency, that is, an excitation pulse, an excitation pulse when the ink is absent is selected, and this excitation pulse is generated. Hereby, the frequency of the residual vibration of the piezoelectric element 12 is measured as shown in FIGS. 4A to 4E.

At this time, even if high frequency noise due to the motor of the ink jet type printer or due to induction of the head drive waveform is applied to a sensor system from the piezoelectric element 12, the frequency of such the high frequency noise does not exist in a pass band width of the band pass filter (BPF) for ink presence 22A, and in a pass band width of the band pass filter (BPF) for ink absence 22B. Therefore, the high frequency noise cannot pass through the band pass filter (BPF) for ink presence 22A or the band pass filter (BPF) for ink absence 22B, so that such the noise does not influence the frequency measurement of the residual vibration.

Subsequently, in a step C3, the control part 200, by confirming the generation of the above time count pulse within the predetermined time, judges whether the frequency measurement of the residual vibration of the piezoelectric element 12 has succeeded in the BPF circuit for ink presence. In case that the measurement has succeeded, the control part 200 outputs its frequency in a step C4, the judgment part 15 judges the existence of ink, and the ink level detecting operation ends. Here, the judgment part 15, by judging whether the residual vibration frequency is in the frequency range in case of the ink presence, judges the existence of the ink.

On the contrary, in case that the frequency measurement of the residual vibration has failed in the step C3, the control part 200, in a step C5, by similarly confirming the generation of the above time count pulse within the predetermined time, judges whether the frequency measurement of the residual vibration of the piezoelectric element 12 has succeeded in the BPF circuit for ink absence. In case that the measurement has succeeded the control part 200 outputs its frequency in the step C4, the judgment part 15 judges the absence of ink, and the ink level detecting operation ends. Here, the judgment part 15, by judging whether the residual vibration frequency is in the frequency range in case of the ink absence, judges the absence of the ink.

On the contrary, in case that the frequency measurement of the residual vibration has failed in the step C5, whether a remeasurement flag is set up or not is judged in a step C6. In case that the remeasurement flag is not set up, the control part 200, after setting up the remeasurement flag in a step C7, waits till a carriage motor for moving a printer head of an ink jet printer and a paper feeding motor stop and further ink ejection stops, and returns to the steps C2A and C2B. Hereby, the influences such as noise due to the carriage motor and the paper feeding motor and noise due to the drive waveform signal in the ink ejection are removed, and the ink level is detected again.

On the contrary, in case that the remeasurement flag is set up in the step C6, since the remeasurement of the ink level has been performed in the steps C2A and C2B to C5 through the steps C7 to C8, the control part 200 performs, as failure of the ink level detection, such appropriate processing as to stop the printing operation of the ink jet type printer in a step C9, and the ink level detecting operation ends.

The ink level detecting unit 10' of the embodiment, by the above operations, can obtain the working advantages similar to those in the first embodiment.

Figure 8:
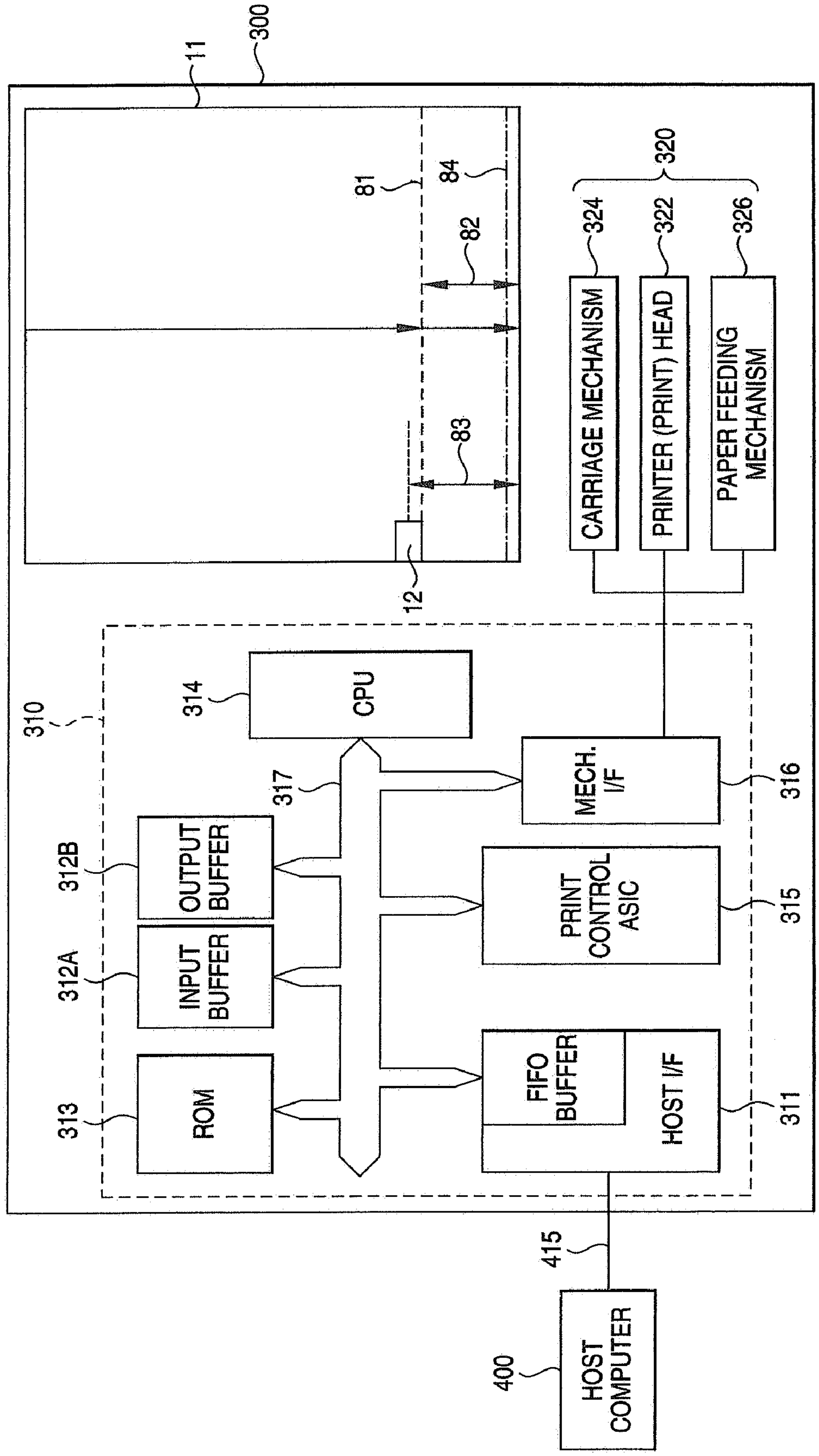
FIG. 8 is a diagram for explaining an ink level detecting method according to a third embodiment of the invention.

FIG. 8 is a block diagram showing the whole constitution of a printer 300 according to a third embodiment of the invention. The shown printer 300 comprises a printer controller 310 and a print engine 320. The printer controller 310 includes an interface (hereinafter referred to as a ⌈host I/F⌋) 311 which receives print data from a host computer 400; an input buffer 312A for temporarily storing the print data input in the printer 300; an output (image) buffer 312B in which the print data stored in the input buffer 312A is interpreted and decompressed into print image data; a ROM 313 which stores routines for various data processing; a CPU 314; a print control ASIC 315 consisting of a print control circuit for sending head data to a printer head 322, and an applied semiconductor integrated circuit (hereinafter referred to as a ⌈ASIC⌋) including various motor drivers; and an interface (hereinafter referred to as a ⌈mech. I/F⌋) 316 for sending image data and a drive signal to the print engine 320. The host I/F 311, the input buffer 312A, the output (image) buffer 312B, the ROM 313, the CPU 314, the print control ASIC 315, and the mech. I/F 316 are connected to one another by a bus 317.

The host I/F 311 includes a FIFO buffer which temporarily stores data in order to transmit and receive the data between the host computer 400 and it, and receives a print command to print data from the host computer 400. The input buffer 312A stores temporarily the print data which the FIFO buffer in the host I/F 311 has received. In the output (image) buffer 312B, image data after the print command to the print data have been analyzed, for example, raster graphics type image data is decompressed. The ROM 313 stores various control programs to be executed by the CPU 314. Further, the ROM 313 stores also font data, graphic function, and various procedures, which are not shown. The CPU 314 plays a central role of various controls in the printer according to this embodiment.

The print engine 320 comprises a print head 322, a carriage mechanism 324, and a paper feeding mechanism 326. The paper feeding mechanism 326 comprises a paper feed motor, a paper feed roller and the like, and feeds out print recording media such as recording paper successively thereby to perform sub-scan. The carriage mechanism 324 comprises a carriage on which the print head 322 is mounted, a carriage motor which runs the carriage through a timing belt, and the like, and moves the print head 322 in the main scanning direction. An ink cartridge constituting an ink tank 11' in the embodiment is fitted into a housing of the carriage to be set. The print head 322 has, in the sub-scanning direction, ink jet nozzle arrays, of which one comprises, for example, 96 nozzles for each color, and ejects an ink droplet from each nozzle at the predetermined timing.

The graphics data taken into the host computer 400 through a not-shown image scanner is converted, by a printer driver on the host computer 400, into data (control command and print data) that the printer 300 can interpret. This converted data, while being managed by an operating system (OS) on the host computer 400, is sent from an interface part (I/F part) of the host computer 400 through a connection cable 415 to the printer 300.

In the printer 300, firstly, the data is received by the host I/F 311 of the printer, its control command and print data are interpreted by the CPU 314 and decompressed into print image data by the output (image) buffer 312B, and printing is executed by the print engine 320. Further, printer status including the ink level is controlled by a not-shown status confirmer on the printer 300 side in real time, and transmitted through a not-shown data transmission part in the host I/F 311 to the host computer 400. Then, by the printer driver on the host computer 400, the ink level is displayed on, for example, a not-shown monitor screen.

The embodiment is characterized in that the ink level detecting method by the above ink level detecting unit (ink level sensor) 10 or 10' according to the first or second embodiment is used together with an ink level calculating method (software count) by software. Further, a software program according to this ink level calculating method is composed of the control program which is executed by the CPU 314 and saved in the ROM 313.

In the embodiment, as the ink level calculating method by software, a method of calculating the ink level is used, which comprises the steps of counting the number of ink dots ejected from the printer (print) head 322, multiplying the counted number by the ink quantity per dot thereby to find the consumed ink quantity, subtracting this consumed ink quantity from ink total quantity in a virgin state, and further subtracting the ink quantity used for maintenance in head cleaning such as ink suction (pumping).

An ink level calculating expression by this software count is represented by the following expression (1):

$$I\ (\text{remain})=I\ (\text{full})-(\text{Count}\times dI)-I(\text{maintain}) \quad (1).$$

Herein,

I (remain): Residual quantity of ink

I (full): Ink quantity of virgin ink cartridge

Count: Dot count number dI: Ink quantity per dot

I (maintain): Ink quantity used for maintenance such as head cleaning

Here, though dI has variations according to individual difference of a head and the ink status, assumable maximum dI is used for calculation in order to prevent dry ejection due to ink shortage.

Therefore, in this ink level calculating method by software, with consumption of ink, errors are gradually stored between the ink level on calculation and the actual ink level. Therefore, it is supposed that a state where ink is consumed only from a bottom of the ink tank (ink cartridge) 11' to a height position 81 (ink liquid level) as shown in FIG. 8 is taken as ink-end on the above dot count. Saying in other words, the portion (shown by an arrow 82) from the bottom of the ink tank 11' to the ink liquid level position 81, shown in FIG. 8, corresponds to calculation error included in one ink cartridge in the ink level calculating method by software, and must be permitted as a margin for preventing the dry ejection due to the ink shortage.

Therefore, in the embodiment, the above ink level detecting method according to the first or second embodiment is used together with the above ink level calculating method by software, whereby ink can be used up to the end, that is, the exact detection of ink-end can be performed.

Namely, in the embodiment, the piezoelectric element 12 as a sensing element in the above ink level detecting unit (ink level sensor) 10 or 10' according to the first or second embodiment is, as shown in FIG. 8, provided on a side surface of the ink tank 11' and in a higher position than the ink liquid level position 81 that is a boundary by the software count. In order to perform more exact ink-end detection, it is preferable that the piezoelectric element 12 is provided in a position that is higher than the ink liquid level position 81 and close to the bottom of the ink tank 11'. In case that the full quantity of ink is in the ink tank (ink cartridge) 11', the ink state is judged to be ink presence by the ink level detecting unit (ink level sensor) 10 or 10' including the piezoelectric element 12. Therefore, the detection of the ink level is continued by the ink level detecting unit (ink level sensor) 10 or 10'. In the boundary region (shown by an arrow 83) between the ink presence and the ink absence (When the ink absence is firstly judged), since the residual ink quantity from the position where the piezoelectric element 12 is fixed is exactly known, the calculation error stored in the ink level calculation by the software is removed at this time, the dot count is anew performed from this position, and the ink is consumed to the ink-end. Though, also in the region shown by the arrow 83 in FIG. 8, the errors are included in the ink level calculation by the software, the stored errors are corrected in the region till the ink level detecting unit (ink level sensor) 10 or 10' detects the ink absence. Therefore, the ink can be used to an ink liquid level position 84, so that the quantity of ink that remains in the ink cartridge (ink tank 11') in the ink-end can be reduced.

As shown in FIG. 8, the piezoelectric element 12 is provided in the higher position than the ink liquid level position 81 that is the limit of the software count. Therefore, though the ink level detecting unit (ink level sensor) 10 or 10' judges that the ink is present, in case that the ink-end is detected by the ink level calculation by the software, it is thought that any troubles are produced in the ink level detecting unit (ink level sensor). Therefore, in order to prevent dry ejection due to the ink shortage, that time is judged to be the ink-end.

Figure 9:
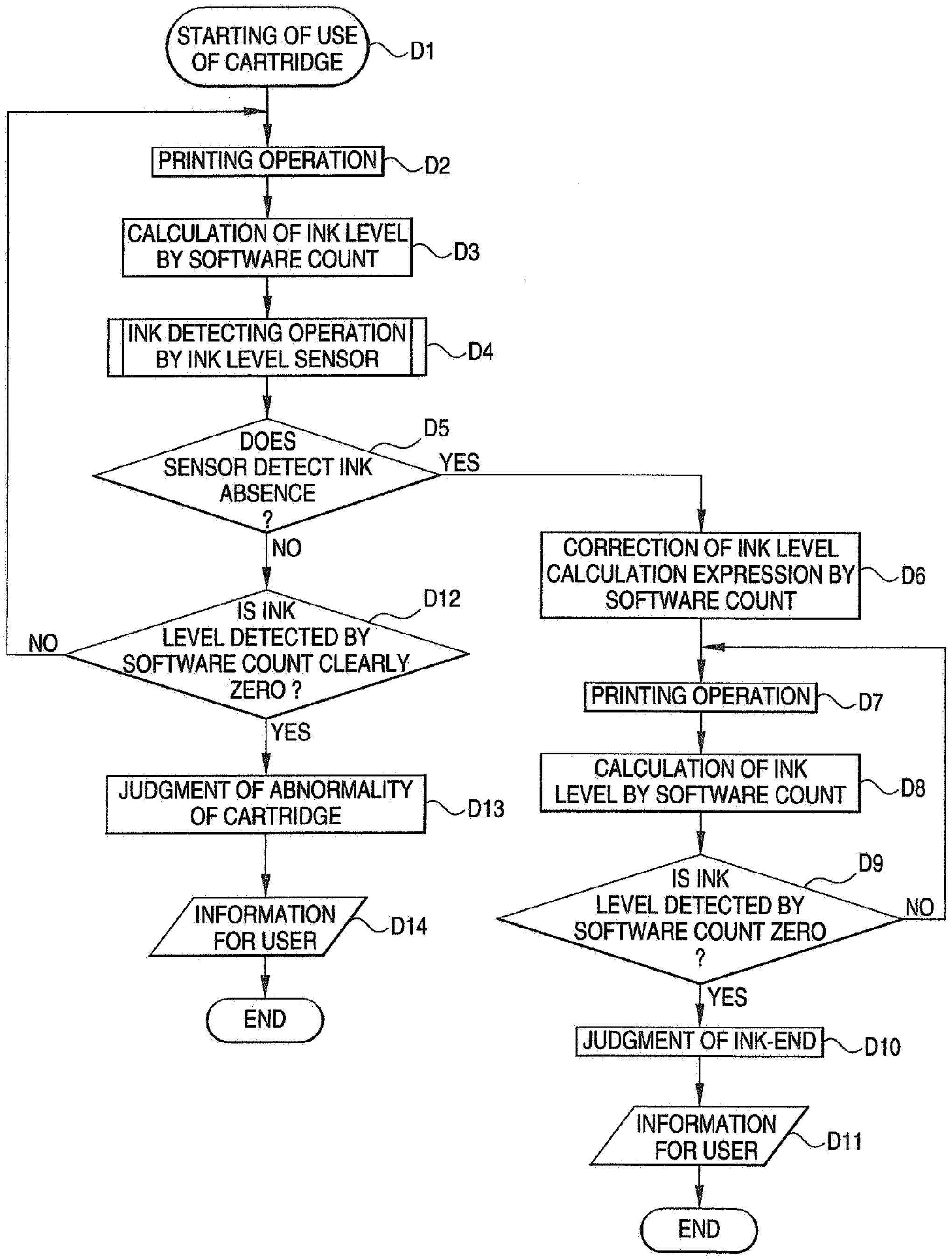
FIG. 9 is a flowchart showing the operation of ink level detection in the third embodiment of the invention.

An ink level detecting method in the embodiment will be described below with reference to a flowchart of FIG. 9.

Firstly, in a step D1, use of the ink cartridge (ink tank 11') is started; and in a step D2, as the printing operation is executed, the ink is consumed more, and the ink in the ink cartridge (ink tank 11') decreases more. In a step D3, the ink level is calculated by the above software count. In a step D4, the ink level detecting unit (ink level sensor) 10 or 10' performs the ink level detection at the predetermined timing. Whether the ink level detecting unit (ink level sensor) 10 or 10' has detected the ink absence or not is judged (step D5). In case that the ink absence has been detected (Yes in the step D5), the above-mentioned ink level calculation expression by the software count is corrected (step D6).

Namely, in case that the ink quantity (shown by the arrow 83) from the position of the piezoelectric element 12 of the ink level detecting unit (ink level sensor) 10 or 10' to the bottom of the ink tank 11' is taken as I (few), when the sensor detects the ink absence, the accumulative calculation errors can be made zero by the following setting:

I (remain)=I (few)

I (full)=I (few)

Count=0

I (maintain)=0

Further, the ink level calculation by the software count is anew performed after this setting to perform printing, whereby the quantity of ink that remains in the ink cartridge when the ink is judged to be the ink-end can be reduced.

Further, when the ink level detecting unit (ink level sensor) 10 or 10' detects the ink absence, the above dI can be corrected from the difference between the ink level on calculation and the actual ink level. Using this corrected dI, the ink quantity that remains in the portion lower than the piezoelectric element 12 of the ink level detecting unit (ink level sensor) 10 or 10' is calculated, whereby more exact judgment of ink-end can be performed, and the ink residual quantity can be more reduced. In case that the ink quantity per dot is different between printing modes, dots should be counted in each ejection mode, and using ratio of the ink quantity in each mode, the ink level calculation and the correction of the calculation expression should be performed.

After the ink level calculation expression has been thus corrected (step D6), the printing operation is continued in a step D7. Hereby, the ink is further consumed, and the ink in the ink cartridge (ink tank 11') further decreases. In a step D8, the ink level is calculated by the above software count. Then, whether the ink level by the software count has come to zero or not is judged (step D9). In case that the ink level has come to zero (Yes in the step D9), this state is judged to be ink-end (step D10). Then, as described above, the ink-end is displayed on a not-shown monitor screen by a printer driver on the host computer 400 shown in FIG. 8 to inform the user of the ink-end (step D11), and the ink level detecting operation ends.

On the other hand, in case that the ink absence has not been detected in the step D5 (No in the step D5), whether the ink level by the software count is zero or not is judged (step D12). In case that the ink level is zero (Yes in the step D12), the ink cartridge (ink tank 11') is judged to be abnormal (step D13). Then, abnormality of the ink cartridge is displayed on the monitor screen to inform the user of the abnormality (step D14), and the ink level detecting operation ends. On the other hand, in case that the ink level by the software count is not zero (No in the step D12), the ink level detecting operation returns to the step D2, and the printing operation is continued.

As described above, according to the ink level detecting method in the embodiment, the above-described ink level detecting method according to the first or second embodiment is used together with the ink level calculating method by software, whereby the ink can be used up to the end, that is, the more exact detection of ink-end can be performed.

In the above embodiments, though, as the vibration element, the piezoelectric element is used, the invention is not limited to this but other piezoelectric elements such as an electrostrictive element and a magentrostrictive element, or other vibration elements may be used.

Further, though, in the above embodiments, the single ink tank 11 is shown, the invention is not limited. It is clear that an ink jet printer which performs color printing of four to seven colors may detect the ink level by providing a vibration element for each ink tank of each color, and detecting a frequency of a counter electromotive force waveform based on residual vibration by resonance with a medium such as ink.

On the other hand, in the above embodiments, an example in which the single ink level detecting unit 10 is provided in the ink tank 11 has been described. However, the plural ink level detecting units may set on the inner wall surface of the ink tank 11 so that their height (depth) positions differ from each other, and the ink level may be measured while the excitation pulse applied to each ink level detecting unit is switched to the ink presence pulse or the ink absence pulse. Hereby, not only the existence of the ink but also the ink level can be measured.

Further, in the above embodiments, the two kinds of excitation pulses; the ink presence excitation pulse and the ink absence excitation pulse are previously registered. However, assuming that ink which is different in properties of matter, for example, viscosity is used, it is possible to register previously plural kinds of excitation pulses.

Next, with reference to FIGS. 10 to 12, a fourth embodiment of the invention will be described. The ink level detecting unit of the invention can be provided for an ink cartridge attached to an ink jet printer detachably, and this embodiment shows such the example.

Figure 10:
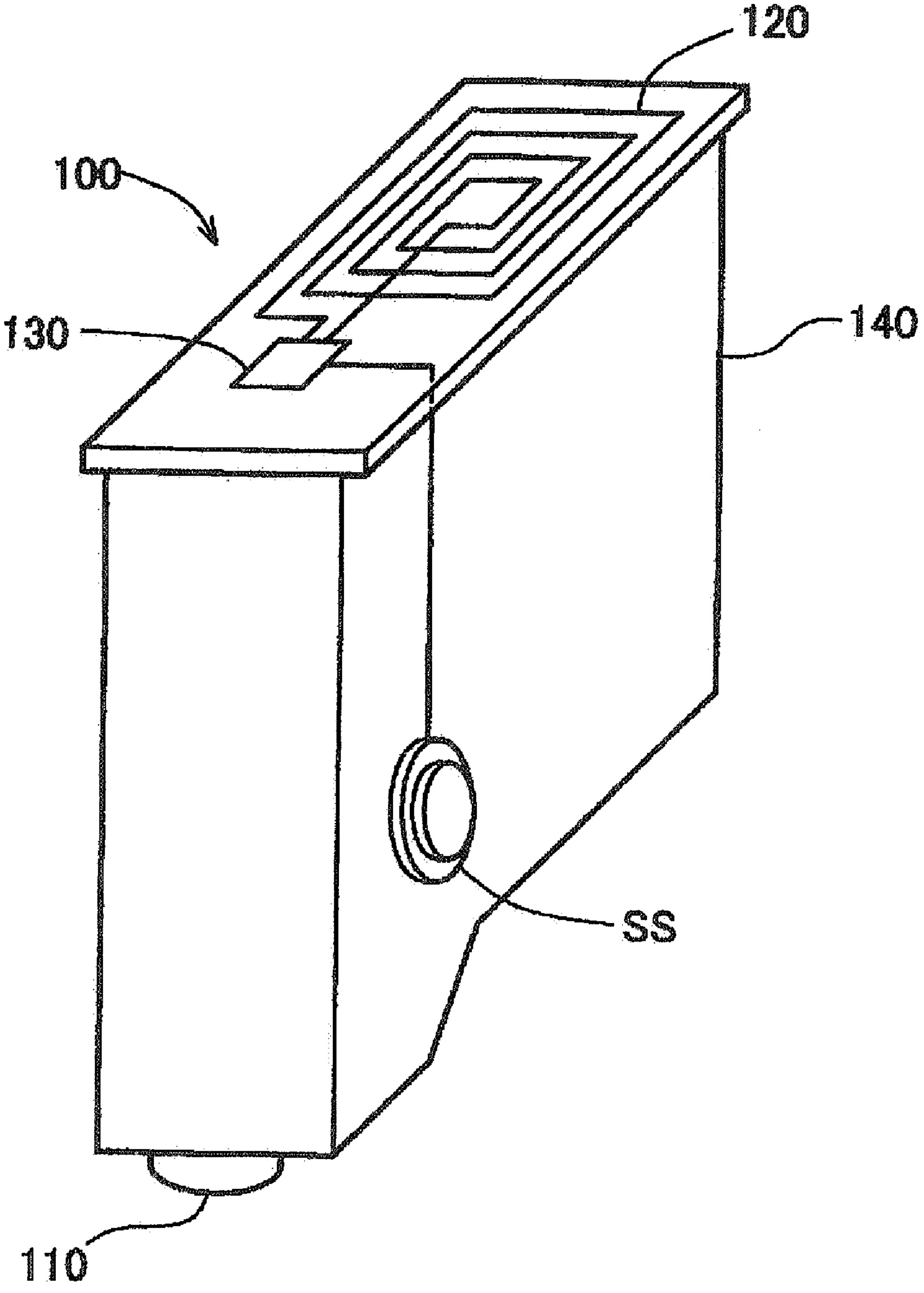
FIG. 10 is an exterior perspective view of an ink cartridge according to a fourth embodiment of the invention.

FIG. 10 is an exterior perspective view of an ink cartridge 100 for which an ink level detecting unit in this embodiment is provided. The ink cartridge 100 has a housing 140 which houses one kind of ink as an article of consumption therein. At the lower portion of the housing 140, an ink supply port 110 for supplying ink to a printer described later is provided. At the upper portion of the housing 140, there is provided a logic circuit 130 composed of a loop antenna 120 for communication with the printer by radio waves and a special IC chip. At the side portion of the housing 140, a sensor SS used for measurement of the ink level is equipped. The sensor SS is electrically connected to the logic circuit 130.

Figure 11:
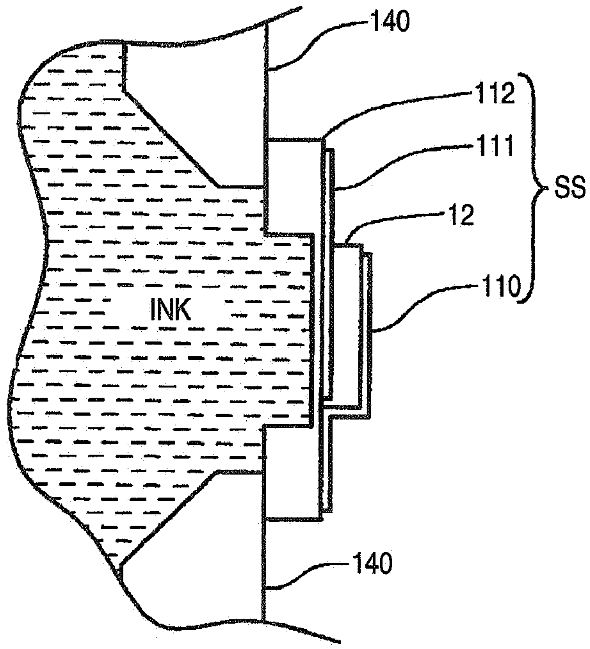
FIG. 11 is a sectional view of a sensor provided for a side part of the ink cartridge shown in FIG. 10.
Figure 11:
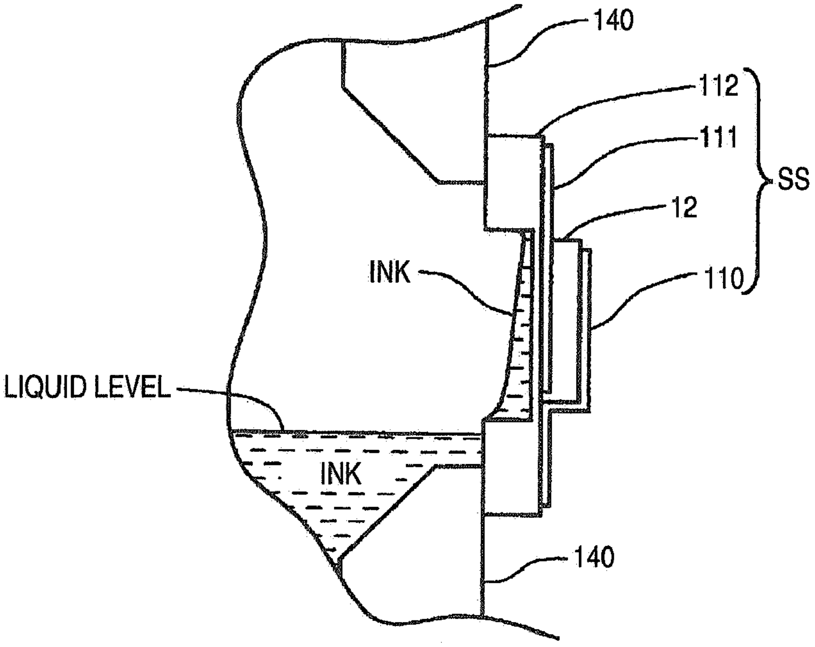

FIG. 11 is a sectional view of the sensor SS equipped for the side portion of the housing 140 of the ink cartridge 100. The sensor SS includes the above-mentioned piezoelectric element 12, two electrodes 110, 111 which apply voltages to the piezoelectric element 12, and a sensor attachment 112. The electrodes 110, 111 are connected to the logic circuit 130. The sensor attachment 112 is a structure part of the sensor SS having a thin film which transmits vibration from the piezoelectric element 12 to the ink and the housing 140.

FIG. 11A shows a case in which the predetermined quantity of ink and more remains, and a liquid level of ink is higher than the position of the sensor SS (in FIG. 10). FIG. 11B shows a case in which the predetermined quantity of ink and more does not remain, and the liquid level of ink is lower than the position of the sensor SS (in FIG. 10). As known from these figures, in case that the liquid level of ink is higher than the position of the sensor SS, the sensor SS, the ink, and the housing 140 function as vibration bodies. However, in case that the liquid level of ink is lower than the position of the sensor SS, the sensor, the housing 140, and only a small quantity of ink attaching to the sensor SS function as vibration bodies. In result, vibration characteristic around the piezoelectric element 12 changes according to the residual quantity of ink. In this embodiment, also, using such the change of vibration characteristic, the ink level is measured. Since the detailed method of measuring the residual quantity is similar to those in the first and second embodiments, its description is omitted.

Figure 12:
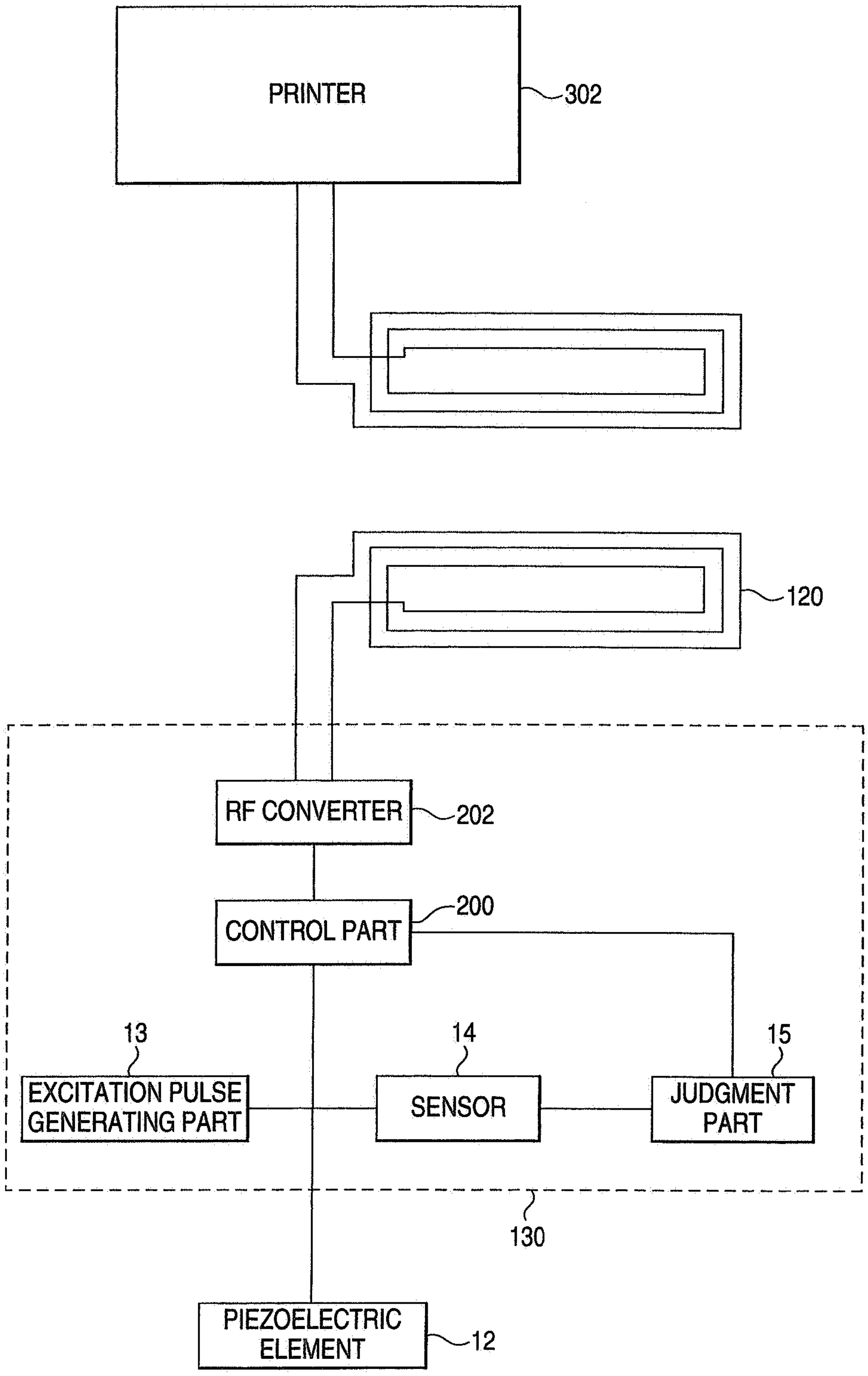
FIG. 12 is a function block diagram of an ink level detecting circuit of the ink cartridge according to the fourth embodiment of the invention.

FIG. 12 is a block diagram centered at the logic circuit 130 composed of the special IC chip provided for the ink cartridge 100. The logic circuit 130, similarly to the cases in the first and second embodiments, includes an excitation pulse generating part 13 for applying an excitation pulse to the piezoelectric element 12; a sensor 14 which detects a frequency of a counter electromotive force waveform based on residual vibration by resonance with ink produced in this piezoelectric element 12; a judgment part 15 which judges the existence of ink; and a control part 200 which controls theses excitation pulse generating part 13, sensor 14, and judgment part 15. Further, in addition to these parts, the logic circuit 130 includes a RF converter 202.

The RF converter 202 includes a demodulation part (not shown) which demodulates the radio waves received from a printer 302 through the loop antenna 120, and a modulation part (not shown) which modulates the signal received from the control part 200 and sends the modulated signal to the printer 302. The printer 302 sends, using the loop antenna 120, a base band signal to the ink cartridge 100 with the carrier wave of the predetermined frequency. On the other hand, the ink cartridge 100, by varying a load of the loop antenna 120 without using the carrier wave, can vary impedance of the loop antenna 120. The ink cartridge 100, using the variation of this impedance, sends a signal to the printer 302. Thus, the ink cartridge 100 and the printer 302 can perform bilateral communication.

Further, the logic circuit 130, in addition, includes a power generating part (not shown) which rectifies the carrier wave received by the RF converter 202 and generates electric power at the predetermined voltage (for example, at 5V). This power generating part supplies the electric power to the RF converter 202 and the control part 200. Further, a charge pump circuit maybe provided, which raises the predetermined voltage generated by the power generating part to the predetermined voltage which the sensor SS requests and supplies the electric power to the sensor 14.

As described above, in this embodiment, since not only the vibration element but also the excitation pulse generating part, the sensor, the judgment part, the filter means, and the frequency detecting means are provided for the ink cartridge, the ink cartridge itself can detect the frequency of the counter electromotive force waveform from the vibration element based on residual vibration by resonance with the medium in the ink cartridge, so that the existence of ink can be surely judged.

Further, without receiving influences by the individual difference of each ink cartridge, for example, even in case that the ink cartridge is exchanged, the exact detection can be performed.

Further, in the embodiment, between the ink cartridge 100 and the printer 302 side, exchange of data is performed using radio communication. The printer body can stably exchange the data with the ink cartridge 100 which moves together with a carriage in printing without fear of poor contact of a contact.

As described above, according to the invention, detects the residual vibration, which is produced by applying excitation to the vibration element such as the piezoelectric element, by resonance with the medium such as the ink that comes into contact with the vibration element can be surely detected without receiving the influence such as noise, so that ink detection accuracy and reliability can be heightened.

Further, also in case that foaming and waving of the ink liquid level are produced due to the movement of the carriage, the erroneous detection can be prevented.

Further, by using the ink level calculating method by software together, the ink-end can be detected more exactly.

Further, the invention can be realized in various embodiments. For example, by the ink level detecting unit and detecting method described in the above embodiments, an ink jet printer, an ink cartridge used in the printer, a printer head, and also by a computer program for realizing their methods or functions of the unit, and a recording medium storing its computer program, the invention can be realized.

Further, the invention can be similarly applied also to, as an ink jet recording apparatus, a facsimile, a copying machine, and a plotter which have the similar ink jet system.

INDUSTRIAL APPLICABILITY

The invention can be utilized in order to detect consumption state (ink level) of ink in an ink container used in an ink jet recording apparatus.

The invention claimed is:

1. An ink level detecting unit including an excitation pulse generating part which applies an excitation pulse to a vibration element provided for an ink tank which houses ink, a sensor which detects a frequency of a counter electromotive force waveform from the vibration element based on residual vibration by resonance with a medium in the ink tank, and a judgment part which judges the existence of ink on the basis of the frequency detected by the sensor, wherein said sensor includes at least one filter which causes only a waveform in a predetermined frequency band, which is based on the presence or absence of ink, to pass, and a frequency detecting circuit which binarizes the counter electromotive force waveform from the vibration element, counts the number of pulses of the binarized counter electromotive force waveform, counts time from a predetermined number-th pulse to a predetermined number of pulse, and detects the frequency of the counter electromotive force waveform on the basis of this time;

said filter comprises a band pass filter for ink presence, and a band pass filter for ink absence, which cause only the waveforms in the predetermined frequency bands that have been previously assumed according to the ink presence and ink absence respectively to pass; and said frequency detecting circuit detects the frequency of the counter electromotive force waveform that has passed through said band pass filter for ink presence or band pass filter for ink absence; and an insensitive band is provided between the pass bands of both band pass filter for ink presence and band pass filter for ink absence.

2. The ink level detecting unit according to claim 1, wherein said frequency detecting circuit comprises a frequency counter for ink presence which detects a frequency of the counter electromotive force waveform that has passed through the band pass filter for ink presence, and a frequency counter for ink absence which detects a frequency of the counter electromotive force waveform that has passed through said band pass filter for ink absence.

3. The ink level detecting unit according to claim 2, wherein in said band pass filter for ink presence and said band pass filter for ink absence, each center frequency is matched with a resonant frequency of said vibration element in a case of the ink presence or in a case of the ink absence; and each pass band is set at the size that can permit the individual variation in said vibration element.

4. An ink jet recording apparatus having the ink level detecting unit according to claim 1.

5. An ink cartridge, which houses ink used in printing and is detachably mounted on an ink jet recording apparatus, including a vibration element provided for the ink cartridge, an excitation pulse generating part which applies an excitation pulse to a piezoelectric element, a sensor which detects a frequency of a counter electromotive force waveform from the vibration element based on residual vibration by resonance with a medium in the ink cartridge, and a judgment part which judges the existence of ink on the basis of the frequency detected by the sensor, wherein said sensor includes at least one filter which causes only a waveform in a predetermined frequency, band, which is based on the ink presence or ink absence, to pass, and a frequency detecting circuit which binarizes the counter electromotive force waveform from the vibration element, counts the number of pulses of the binarized counter electromotive force waveform, counts time from a predetermined number-th pulse to a predetermined number of pulse, and detects the frequency of the counter electromotive force waveform on the basis of this time, said filter comprises a band pass filter for ink presence, and a band pass filter for ink absence, which cause only the waveforms in the predetermined frequency bands to pass;

and said frequency detecting circuit detects the frequency of the counter electromotive force waveform that has passed through said band pass filter for ink presence or band pass filter for ink absence; and an insensitive band is provided between the pass bands of both band pass filter for ink presence and band pass filter for ink absence.

6. The ink cartridge according to claim 5, wherein said frequency detecting circuit comprises a frequency counter for ink presence which detects a frequency of the counter electromotive force waveform that has passed through the band pass filter for ink presence, and a frequency counter for ink absence which detects a frequency of the counter electromotive force waveform that has passed through said band pass filter for ink absence.

7. The ink cartridge according to claim 5 or 6, wherein in said band pass filter for ink presence and said band pass filter for ink absence, each center frequency is matched with a resonant frequency of said vibration element in a case of the ink presence or in a case of the ink absence; and each pass band is set at the size that can permit the individual variation in said vibration element.

8. The ink cartridge according to claim 5, further comprising an antenna which sends and receives radio waves between an ink jet recording apparatus and the antenna, and an RF converter which demodulates a signal received from said ink jet recording apparatus through the antenna to input the demodulated signal to a control part, and modulates a signal received from said control part to send the modulated signal to said ink jet recording apparatus through said antenna.

9. The ink cartridge according to claim 8 wherein said excitation pulse generating part, sensor, judgment part, filter, frequency detecting circuit, and the RF converter are provided, as a special IC chip, for the cartridge.

10. A method of detecting level of ink in an ink tank used in an ink jet recording apparatus, comprising the steps of applying an excitation pulse to a vibration element provided for the ink tank, detecting a frequency of a counter electromotive force waveform from the vibration element based on residual vibration due to resonance with a medium in the ink tank, and judging the existence of ink on the basis of the detected frequency, wherein of the counter electromotive force waveforms from said vibration element, only the waveform in a predetermined frequency band, which is based on the ink presence or ink absence is caused, to pass by a filter; the waveform that has passed is binarized and the number of pulses of the binarized waveform is counted; time from a predetermined number-th pulse to a predetermined number of pulse is counted; and a frequency of said counter electromotive force waveform is detected on the basis of this time, causing, via the filter only the waveforms in the predetermined frequency bands that have been previously assumed according to an ink presence and an ink absence respectively to pass;

detecting the frequency of the counter electromotive force waveform that has passed through the filter for the ink presence or for the ink absence; and providing an insensitive band between the pass bands for ink presence and for ink absence.

11. The ink level detecting method according to claim 10, wherein a method of detecting the ink level by counting a number of dots of ink ejected from a print head in the ink jet recording apparatus is used.

* * * * *